(12) United States Patent
Zuniga et al.

(10) Patent No.: US 11,171,749 B2
(45) Date of Patent: *Nov. 9, 2021

(54) METHOD FOR PERFORMING WIRELESS SWITCHING

(71) Applicant: InterDigital Technology Corporation, Wilmington, DE (US)

(72) Inventors: Juan Carlos Zuniga, Montreal (CA); Teresa Hunkeler, Halifax (CA)

(73) Assignee: InterDigital Technology Corporation, Wilmington, DE (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/173,512

(22) Filed: Oct. 29, 2018

(65) Prior Publication Data

US 2019/0068339 A1    Feb. 28, 2019

Related U.S. Application Data

(63) Continuation of application No. 15/636,900, filed on Jun. 29, 2017, now Pat. No. 10,116,421, which is a (Continued)

(51) Int. Cl.
*H04L 5/00* (2006.01)
*H04W 72/04* (2009.01)
(Continued)

(52) U.S. Cl.
CPC ......... *H04L 5/0023* (2013.01); *H04B 7/0617* (2013.01); *H04W 72/04* (2013.01); (Continued)

(58) Field of Classification Search
None
See application file for complete search history.

(56) References Cited

U.S. PATENT DOCUMENTS

| 5,463,400 A | 10/1995 | Tayloe |
| 5,726,978 A | 3/1998 | Frodigh et al. |

(Continued)

FOREIGN PATENT DOCUMENTS

| EP | 1263168 | 12/2002 |
| JP | 10-126850 | 5/1998 |

(Continued)

OTHER PUBLICATIONS

Berezdivin et al. "Next Generation Wireless Communications Concepts and Technologies," IEEE, pp. 108-116, (Mar. 2002).

(Continued)

*Primary Examiner* — Gregory B Sefcheck
(74) *Attorney, Agent, or Firm* — Volpe Koenig

(57) ABSTRACT

A wireless communication system includes an infrastructure device for transmitting and receiving communications to and from a plurality of wireless user terminals. Each wireless user terminal includes a receiver and a controller configured to receive a plurality of orthogonal frequency division multiplexing (OFDM) signals on at least one downlink carrier frequency. Each of the plurality of OFDM signals includes assignment information. The receiver is configured to receive a plurality of downlink signals each responsive to a respective OFDM signal of the plurality of OFDM signals such that each downlink signal is received on a downlink carrier frequency and using a downlink spatial pattern. Further, the controller is configured to dynamically change the downlink carrier frequency of the receiver for receiving the plurality of downlink signals based on the plurality of OFDM signals, wherein the plurality of downlink signals have different spatial patterns.

12 Claims, 2 Drawing Sheets

Related U.S. Application Data continuation of application No. 14/539,456, filed on Nov. 12, 2014, now Pat. No. 9,712,294, which is a continuation of application No. 13/113,713, filed on May 23, 2011, now Pat. No. 8,917,660, which is a continuation of application No. 10/334,858, filed on Dec. 31, 2002, now abandoned.

(60) Provisional application No. 60/394,151, filed on Jul. 5, 2002.

(51) Int. Cl.
*H04B 7/06* (2006.01)
*H04W 4/06* (2009.01)
*H04W 16/14* (2009.01)
*H04W 72/08* (2009.01)
*H04W 84/12* (2009.01)
*H04W 88/08* (2009.01)
*H04W 88/02* (2009.01)

(52) U.S. Cl.
CPC ..... *H04W 72/042* (2013.01); *H04W 72/0453* (2013.01); *H04W 4/06* (2013.01); *H04W 16/14* (2013.01); *H04W 72/046* (2013.01); *H04W 72/08* (2013.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 5,781,536 A | 7/1998 | Ahmadi et al. | |
| 5,933,420 A | 8/1999 | Jaszewski et al. | |
| 6,052,594 A | 4/2000 | Chuang et al. | |
| 6,112,094 A | 8/2000 | Dent | |
| 6,134,261 A * | 10/2000 | Ryan | H04B 7/0619 370/203 |
| 6,144,340 A | 11/2000 | Kliski et al. | |
| 6,144,711 A | 11/2000 | Raleigh et al. | |
| 6,215,982 B1 | 4/2001 | Trompower | |
| 6,259,898 B1 | 7/2001 | Lewis | |
| 6,345,043 B1 | 2/2002 | Hsu | |
| 6,359,923 B1 * | 3/2002 | Agee | H04B 1/69 370/342 |
| 6,377,562 B1 * | 4/2002 | Schneider | H04J 3/1682 370/330 |
| 6,393,261 B1 | 5/2002 | Lewis | |
| 6,452,981 B1 | 9/2002 | Raleigh et al. | |
| 6,473,467 B1 * | 10/2002 | Wallace | H04B 7/0417 375/267 |
| 6,480,522 B1 * | 11/2002 | Hoole | H04B 1/69 370/242 |
| 6,498,822 B1 * | 12/2002 | Tanaka | H04L 27/2657 375/139 |
| 6,584,144 B2 * | 6/2003 | Alamouti | H04B 7/0617 375/147 |
| 6,600,776 B1 * | 7/2003 | Alamouti | H04B 7/10 375/147 |
| 6,603,744 B2 | 8/2003 | Mizutani et al. | |
| 6,611,231 B2 * | 8/2003 | Crilly, Jr. | H01Q 1/521 342/378 |
| 6,621,851 B1 * | 9/2003 | Agee | H04B 1/69 370/242 |
| 6,647,015 B2 | 11/2003 | Malkemes et al. | |
| 6,687,492 B1 * | 2/2004 | Sugar | H01Q 3/28 455/114.2 |
| 6,721,569 B1 | 4/2004 | Hashem et al. | |
| 6,785,513 B1 * | 8/2004 | Sivaprakasam | H04B 7/0617 455/11.1 |
| 6,785,520 B2 * | 8/2004 | Sugar | H03G 3/3089 455/101 |
| 6,795,424 B1 * | 9/2004 | Kapoor | H01Q 1/246 370/208 |
| 6,813,254 B1 | 11/2004 | Mujtaba | |
| 6,850,741 B2 * | 2/2005 | Lei | H04B 7/0408 342/359 |
| 6,859,450 B1 | 2/2005 | Mansfield | |
| 6,870,808 B1 * | 3/2005 | Liu | H04L 5/023 370/203 |
| 6,888,899 B2 | 5/2005 | Raleigh et al. | |
| 6,904,283 B2 | 6/2005 | Li et al. | |
| 6,940,827 B2 | 9/2005 | Li et al. | |
| 6,952,454 B1 * | 10/2005 | Jalali | H04L 5/023 375/260 |
| 6,967,937 B1 | 11/2005 | Gormley | |
| 6,996,077 B1 * | 2/2006 | Suenaga | H04B 7/18526 370/316 |
| 6,999,724 B2 * | 2/2006 | Chizhik | H04B 7/01 342/370 |
| 7,020,110 B2 * | 3/2006 | Walton | H04L 5/0042 370/334 |
| 7,020,490 B2 * | 3/2006 | Khatri | H04B 7/0413 370/340 |
| 7,072,315 B1 | 7/2006 | Liu et al. | |
| 7,075,967 B2 | 7/2006 | Struhsaker et al. | |
| 7,110,349 B2 * | 9/2006 | Branlund | H04B 1/71052 370/203 |
| 7,133,380 B1 | 11/2006 | Winters et al. | |
| 7,139,330 B1 * | 11/2006 | May | H03D 7/00 375/316 |
| 7,167,526 B2 * | 1/2007 | Liang | H04B 7/0669 375/148 |
| 7,177,369 B2 * | 2/2007 | Crilly, Jr. | H04B 7/0617 375/285 |
| 7,197,022 B2 | 3/2007 | Stanwood et al. | |
| 7,206,586 B2 | 4/2007 | Kim et al. | |
| 7,230,931 B2 | 6/2007 | Struhsaker | |
| 7,248,841 B2 | 7/2007 | Agee | |
| 7,251,460 B2 * | 7/2007 | Khatri | H04B 7/0617 375/267 |
| 7,289,467 B2 | 10/2007 | Bourlas et al. | |
| 7,304,939 B2 | 12/2007 | Steer et al. | |
| 7,327,797 B2 * | 2/2008 | Yu | H04B 7/086 375/267 |
| 7,346,357 B1 | 3/2008 | Kim et al. | |
| 7,414,964 B2 | 8/2008 | Hashem et al. | |
| 7,430,257 B1 * | 9/2008 | Shattil | H04B 1/707 342/367 |
| 7,573,891 B1 | 8/2009 | Chow et al. | |
| 7,626,920 B2 | 12/2009 | Grindahl et al. | |
| 7,636,573 B2 | 12/2009 | Walton et al. | |
| 7,852,812 B2 | 12/2010 | Li et al. | |
| 7,876,716 B2 | 1/2011 | Sudo | |
| 8,036,164 B1 | 10/2011 | Winters et al. | |
| 8,040,855 B2 | 10/2011 | Li et al. | |
| 8,050,288 B2 * | 11/2011 | Kapoor | H01Q 1/246 370/252 |
| 8,094,625 B2 | 1/2012 | Walton et al. | |
| 9,628,231 B2 | 4/2017 | Shattil | |
| 2001/0022805 A1 | 9/2001 | Dabak et al. | |
| 2001/0030988 A1 | 10/2001 | Fry | |
| 2002/0021684 A1 | 2/2002 | Toshimitsu et al. | |
| 2003/0067901 A1 | 4/2003 | Schein et al. | |
| 2003/0156570 A1 | 8/2003 | Alamouti et al. | |
| 2005/0171995 A1 | 8/2005 | Grindahl et al. | |
| 2007/0030886 A1 | 2/2007 | Doi | |
| 2016/0254889 A1 | 9/2016 | Shattil | |

FOREIGN PATENT DOCUMENTS

| | | |
|---|---|---|
| JP | 2001-169344 | 6/2001 |
| JP | 2001-298436 | 10/2001 |
| JP | 2002-084221 | 3/2002 |
| JP | 2002-112322 | 4/2002 |
| JP | 2003-052079 | 2/2003 |
| KR | 2001-0090038 | 10/2001 |
| WO | 98/12833 | 3/1998 |
| WO | 99/21310 | 4/1999 |

(56) References Cited

FOREIGN PATENT DOCUMENTS

| WO | 99/56416 | 11/1999 |
|----|----------|---------|
| WO | 00/64006 | 10/2000 |
| WO | 02/11348 | 2/2002 |
| WO | 02/28121 | 4/2002 |
| WO | 02/37754 | 5/2002 |

OTHER PUBLICATIONS

Cisco Systems, "CSMA/CD," available at www.cisco.com/en/US/tech/tk389/tk214/tk125/tech_protocol_home.html (Sep. 20, 1996).
Information technology—Telecommunications and information exchange between systems—Local and metropolitan area networks—Specific requirements—Part 11: Wireless LAN Medium Access Control (MAC) and Physical Layer (PHY) Specifications, ANSI/IEEE Std 802.11, 1999 Edition (Mar. 18, 1999).
Ko et al., "Medium Access Control Protocols Using Directional Antennas in Ad Hoc Networks." InfoCom 2000. Nineteenth Annual Joint Conference of the IEEE Computer and Communications Societies. Proceedings, IEEE Tel Aviv, Israel, Mar. 26-30, 2000, vol. 1, Mar. 26, 2000. pp. 13-21.
Muta et al., "Adaptive Channel Selection in Frequency-selective Fading Environment," IEEE International Conference on Communications, vol. 3, pp. 1846-1851 (1999).
Muta et al., "Adaptive Channel Selection in Frequency-selective Fading Environment," IEICE Transactions on Communications, vol. J82-B, No. 5, pp. 991-1000, (May 1999). (In Japanese).
Myles et al. "IEEE 802.11h Potential Draft Text D2.0" IEEE P802.11 Wireless LANs, Mar. 2002, pp. i-67.

\* cited by examiner

METHOD FOR PERFORMING WIRELESS SWITCHING

CROSS REFERENCE TO RELATED APPLICATION

This application is a continuation of U.S. patent application Ser. No. 15/636,900 filed Jun. 29, 2017, which issued as U.S. Pat. No. 10,116,421 on Oct. 30, 2018, which is a continuation of U.S. patent application Ser. No. 14/539,456 filed Nov. 12, 2014, which issued as U.S. Pat. No. 9,712,294 on Jul. 18, 2017, which is a continuation of U.S. patent application Ser. No. 13/113,713 filed May 23, 2011, which issued as U.S. Pat. No. 8,917,660 on Dec. 23, 2014, which is a continuation of U.S. patent application Ser. No. 10/334,858 filed Dec. 31, 2002, now abandoned, which claims the benefit of U.S. Provisional Application No. 60/394,151, filed on Jul. 5, 2002, the contents of which are hereby incorporated by reference herein.

FIELD OF INVENTION

The present invention relates to a Wireless LAN system (WLAN) with several users connected. More particularly, switching of WLAN systems for avoiding collisions.

BACKGROUND

WLAN systems make use of the unlicensed bands for wireless communication. Transmissions of a wireless LAN (WLAN) communication system may be from a particular terminal to a desired destination, either another terminal within the same Basic Service System (BSS) or the backbone network, but always within the same carrier. There are two modes of operation for WLAN systems: ad-hoc and infrastructure. In the ad-hoc mode, terminals can talk to each other in a multipoint-to-multipoint fashion. In the infrastructure mode, an access point (AP) acts as a base station to control the transmissions among users, thus providing a point-to-multipoint wireless network. Since all the users share the same medium in a WLAN, the infrastructure mode becomes more efficient for semi-heavy to heavy loaded networks.

In an infrastructure mode, the terminal first communicates with the AP when sending data to a desired destination terminal. The AP in turn bridges or routes the information to the desired destination. Thus, in this mode, an AP of a WLAN communication system controls the transmissions within a BSS or cell.

Medium Access Control (MAC) protocols are defined to coordinate the channel usage for WLAN users sharing the band. These MAC protocols are based upon avoiding collisions between users as several users access the channel at the same time. The efficiency of a protocol is gauged by successful avoidance of collisions.

Two protocols used by WLAN are CSMA/CA MAC and CSMA/CD Ethernet protocol. Both protocols can sense the carrier for other transmissions. An Ethernet can be connected in various manners, including Ethernet hubs and Ethernet switches. An Ethernet hub concentrates the connections in a central point as a point-to-multipoint connection, with no impact on performance. An Ethernet switch operates every time that there is a packet arrival from a terminal. The switch reads the destination address, learns on which port it is connected and makes a direct connection between the two physical ports. The advantage of the Ethernet switch is that the MAC does not sense any other user in the medium, which improves performance through reduced probability of collisions and enhanced throughput as compared to an Ethernet hub. An Ethernet hub forwards a received packet to all users, even when there is only one intended receiver. The hub does not look at address information. The Ethernet switch only sends the packet directly to the intended destination, resulting in a more efficient usage of the available bandwidth.

A common WLAN AP is not capable of using more than one carrier frequency at the same time, which results in low protocol efficiency. Ethernet switches have proven to improve the efficiency of the Ethernet protocol considerably.

Therefore, what is needed is a method for improving the performance of a wireless point-to-multipoint network when the terminals share the same medium.

SUMMARY

A wireless communication system includes an infrastructure device for transmitting and receiving communications to and from a plurality of wireless user terminals. Each wireless user terminal includes a receiver and a controller that receives a plurality of orthogonal frequency division multiplexing (OFDM) signals on a first carrier frequency of a downlink. Each of the plurality of OFDM signals includes carrier frequency assignment information indicating a carrier frequency to transmit uplink data and spatial pattern information indicating a spatial pattern. In response to the carrier frequency assignment information of each of the plurality of OFDM signals, a transmitter and the controller of the wireless user terminal transmit a plurality of uplink signals. Each of the plurality of uplink signals are transmitted on the indicated carrier frequency and using the indicated spatial pattern.

BRIEF DESCRIPTION OF THE DRAWING(S)

DESCRIPTION OF THE PREFERRED EMBODIMENTS

Figure 1A:
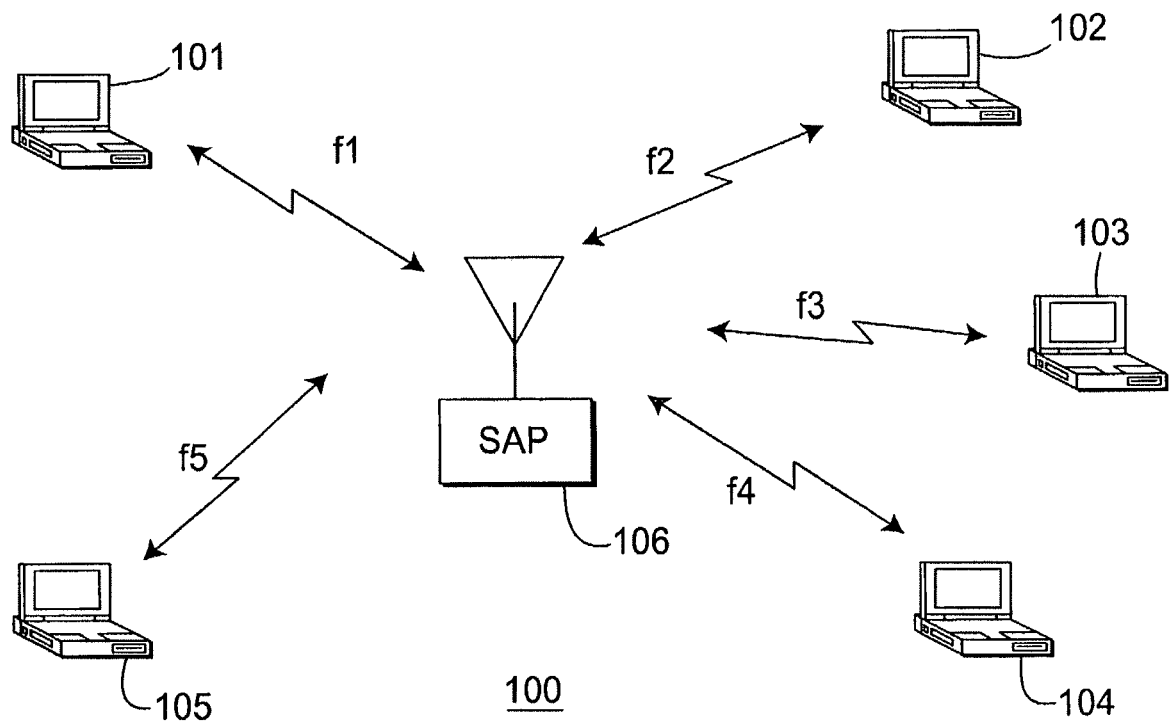
FIG. 1A shows a system diagram of a WLAN with frequency carrier Ethernet ports.

FIG. 1A shows a system that applies the Ethernet switch principle to an access point (AP), allowing multi-frequency operation, so that the AP becomes a Switching Access Point (SAP) 106. Frequency carriers f1-f5 are treated as different ports in the SAP, from which user terminals 101-105 have centralized access to frequency carriers f1-f5 in a controlled manner.

As shown in FIG. 1A, each user terminal 101-105 is assigned to a frequency carrier f1-f5 and SAP 106 is capable of receiving and transmitting each carrier f1-f5. In order to avoid permanent assignment of carriers f1-f5 to each user terminal 101-105, two approaches may be used. In the preferred embodiment, it is desirable, although not essential, to not permanently assign carriers to user terminals 101-105. A non-permanent assignment avoids assigning a frequency to a terminal not sending data. When there are more terminals than available frequencies, a terminal that has data to send can be prevented from doing so if the terminal permanently assigned to a frequency is not using it.

A dynamic carrier assignation (DCA) scheme can be applied, in which user terminals 101-105 send a request-to-send (RTS) in a shared carrier and then the SAP replies with a clear-to-send (CTS) indicating the carrier that can be used for the transmission.

Alternatively, a frequency hopping scheme may be used, in which user terminals 101-105 have a pseudo-random sequence for changing carriers, known a priori by user terminals 101-105 and SAP 106, to minimize the probability of two user terminals simultaneously using the same carrier. For a preferred WLAN developed according to the current 802.11b standard, three carriers are used for frequency hopping. For the 802.11a standard, eight carriers are used for frequency hopping. Wireless switching system 100 may employ DCA and frequency hopping either separately or combined.

Figure 1B:
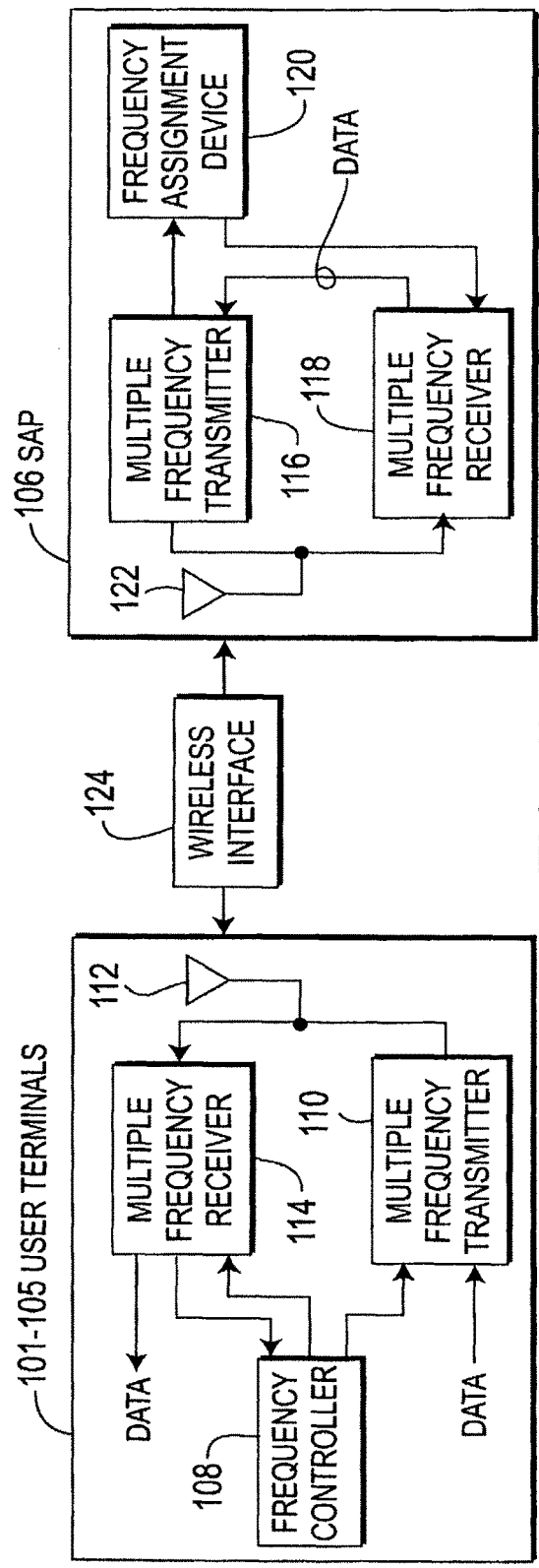
FIG. 1B shows a simplified diagram of a user terminal and a switching access point using frequency carrier Ethernet ports.

FIG. 1B is an illustration of a preferred user terminal and SAP using multiple frequencies. The SAP 106 has a frequency assignment device 120 for assigning frequencies (frequency ports) to the user terminals 101-105. A multiple frequency receiver 118 receives data sent by the terminals 101-105 using the assigned frequency port. A multiple frequency transmitter 116 sends data from one terminal to another using the assigned frequency of the destination terminal. The multiple frequency transmitter 116 preferably also transmits the frequency assignment to the terminals 101-105. An antenna 122 or antenna array is used to send and receive data by the SAP 106 over the wireless interface 124.

The terminals 101-105 have a multiple frequency receiver 114 for receiving the frequency assignment and recovers the transmitted data over the terminal's assigned frequency. A frequency controller 108 users the received assigned frequencies to control the transmission and reception frequencies of the terminal 101-105. A multiple frequency transmitter 110 transmits the data over the assigned frequency.

Figure 2A:
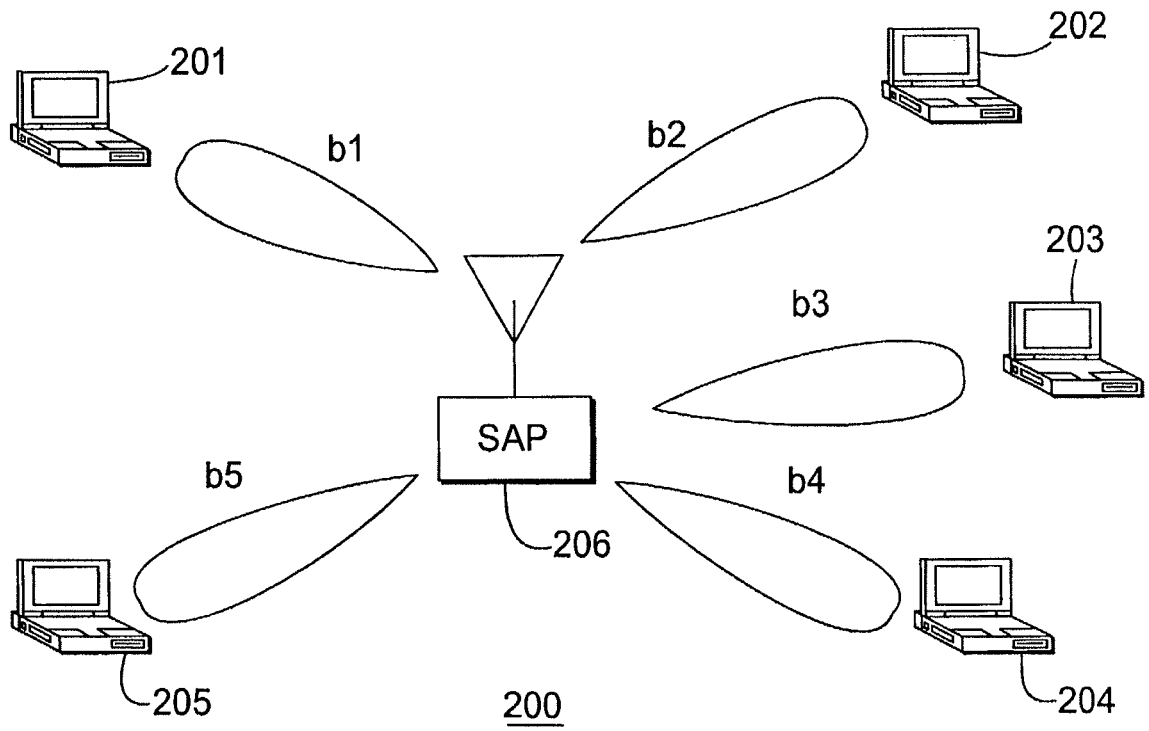
FIG. 2A shows a system diagram of a WLAN with spatial beam Ethernet ports.

FIG. 2A shows an alternative embodiment of wireless switching by assigning each user terminal 201-205 to a spatial port instead of a particular frequency. As shown in FIG. 2A, spatial beams b1-b5 are created by beam forming and can be used as ports to isolate user terminals 201-206 from each other. SAP 206 recognizes the destination address of each user terminal 201-205, and associates a beam to each address. SAP 206 is capable of receiving more than one beam at the same time.

Figure 2B:
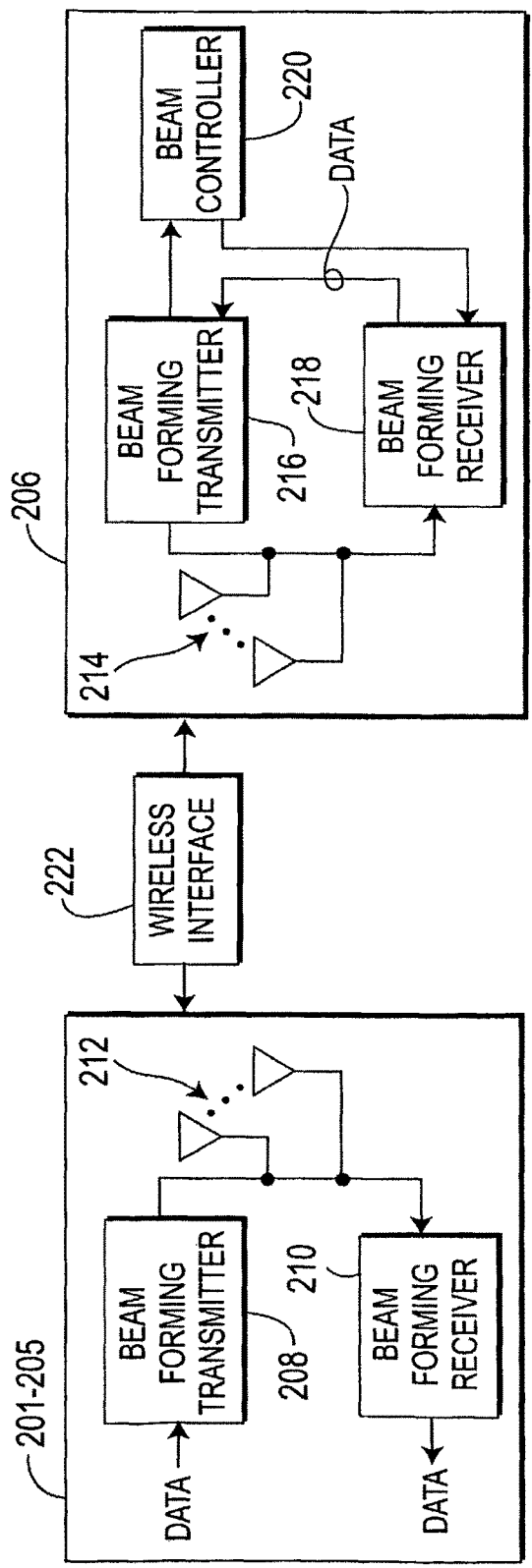
FIG. 2B shows a simplified diagram of a user terminal and a switching access point using spatial beam Ethernet ports.

FIG. 2B is an illustration of a preferred user terminal and SAP using spatial beams. The SAP 206 has a beam controller 220 for determining which beam (spatial port) is associated with a particular user. The controller 220 provides a beam forming transmitter 216 and a beam forming receiver 218 the beam information so that the appropriate spatial port is used for a given terminal. An antenna array 214 is used to send and receive data over the wireless interface 222.

The terminals 201-205 have a beam forming receiver 210 for receiving transmitted data using an antenna array 212. A beam forming transmitter 208 is used to transmit data to the SAP 206 using the array 212.

Although the system configurations of FIGS. 1A, 1B, 2A and 2B show five user terminals, any number of user terminals may be used. The intent is to demonstrate and not to limit or restrict the scope of the system capabilities. The wireless switching systems of FIGS. 1A and 2A can be used separately or combined. To illustrate, user terminals 101-105 can be distinguished by a combination of spatial beam and frequency. The wireless switching systems of FIGS. 1A and 2A can be applied to systems including, but not limited to, direct sequence (DS) WLAN and orthogonal frequency division multiplexing (OFDM) WLAN systems.

What is claimed is:

1. A wireless user terminal comprising:
a plurality of antennas;
a receiver; and
a controller;
the plurality of antennas, the receiver, and the controller configured to receive a first plurality of downlink orthogonal frequency division multiplexing (OFDM) signals on at least one downlink carrier frequency, wherein each of the first plurality of downlink OFDM signals includes assignment information, and wherein each of the assignment information indicates a downlink carrier frequency and information associated with a downlink beam for receiving a respective one of a second plurality of downlink OFDM signals; and
the plurality of antennas, the receiver, and the controller further configured to receive the second plurality of downlink OFDM signals based on the assignment information included in the first plurality of downlink OFDM signals, wherein at least a first downlink OFDM signal of the second plurality of downlink OFDM signals is received using a different downlink carrier frequency and a different downlink beam than at least a second downlink OFDM signal of the second plurality of downlink OFDM signals.

2. The wireless user terminal of claim 1 wherein each downlink carrier frequency comprises a mutually non-overlapping band of sub-carriers.

3. The wireless user terminal of claim 1 further comprising a transmitter, wherein the plurality of antennas, the transmitter, and the controller are configured to transmit a plurality of uplink OFDM signals using at least two different uplink beams.

4. The wireless user terminal of claim 1 further comprising a transmitter, wherein the plurality of antennas, the transmitter, and the controller are configured to transmit a plurality of uplink OFDM signals using at least two different uplink carriers based on received uplink channel assignment information.

5. A method performed by a wireless user terminal, the method comprising:
receiving a first plurality of downlink orthogonal frequency division multiplexing (OFDM) signals on at least one downlink carrier frequency, wherein each of the first plurality of downlink OFDM signals includes assignment information, and wherein each of the assignment information indicates a downlink carrier frequency and information associated with a downlink beam for receiving a respective one of a second plurality of downlink OFDM signals; and
receiving the second plurality of downlink OFDM signals based on the assignment information included in the first plurality of downlink OFDM signals, wherein at least a first downlink OFDM signal of the second plurality of downlink OFDM signals is received using a different downlink carrier frequency and a different downlink beam than at least a second downlink OFDM signal of the second plurality of downlink OFDM signals.

6. The method of claim 5 wherein each downlink carrier frequency comprises a mutually non-overlapping band of sub-carriers.

7. The method of claim 5 further comprising transmitting a plurality of uplink OFDM signals using at least two different uplink beams.

8. The method of claim 5 further comprising transmitting a plurality of uplink OFDM signals using at least two different uplink carriers based on received uplink channel assignment information.

9. A wireless infrastructure device comprising:
a plurality of antennas;
a transmitter; and
a receiver;
the plurality of antennas and the transmitter configured to transmit a first plurality of downlink orthogonal frequency division multiplexing (OFDM) signals on at least one downlink carrier frequency, wherein each of the first plurality of downlink OFDM signals includes assignment information for a wireless user terminal, and wherein each of the assignment information indicates a downlink carrier frequency and information associated with a downlink beam for receiving a respective one of a second plurality of downlink OFDM signals; and
the plurality of antennas and the transmitter further configured to transmit a second plurality of downlink OFDM signals to the wireless user terminal, wherein at least a first downlink OFDM signal of the second plurality of downlink OFDM signals uses a different downlink carrier frequency and a different downlink beam than at least a second downlink OFDM signal of the second plurality of downlink OFDM signals.

10. The wireless infrastructure device of claim 9 wherein each downlink carrier frequency comprises a mutually non-overlapping band of sub-carriers.

11. The wireless infrastructure device of claim 9, wherein the plurality of antennas and the receiver are configured to receive a plurality of uplink OFDM signals from the wireless user terminal using at least two different uplink beams.

12. The wireless infrastructure device of claim 9, wherein the plurality of antennas and the receiver are configured to receive a plurality of uplink OFDM signals from the wireless user terminal using at least two different uplink carriers based on received uplink channel assignment information.

* * * * *